(No Model.) 6 Sheets—Sheet 2.
G. T. PATTERSON & J. W. DICKIESON.
COMBINED RULING MACHINE AND PRINTING ATTACHMENT.
No. 393,517. Patented Nov. 27, 1888.
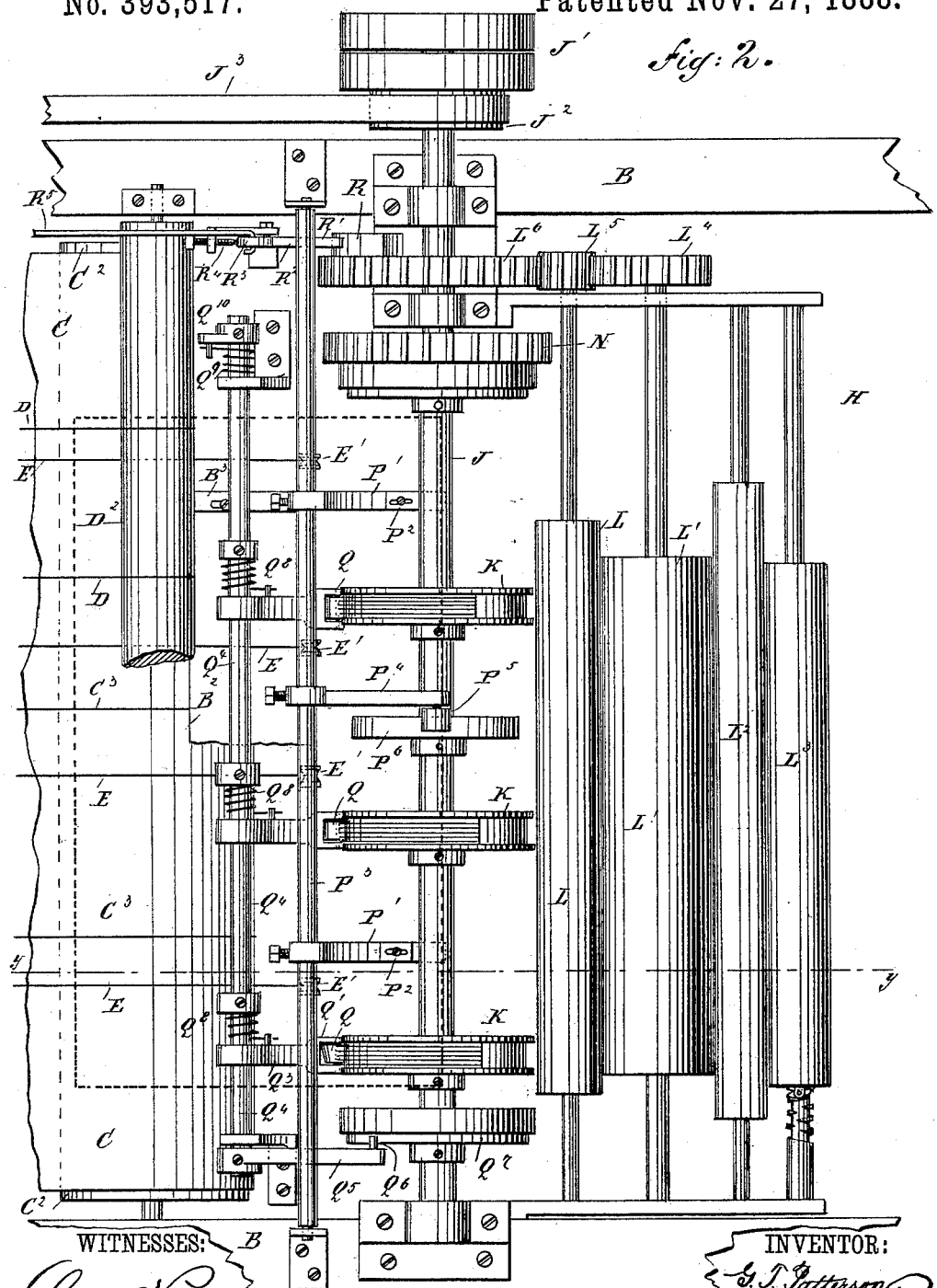
WITNESSES:
INVENTOR:

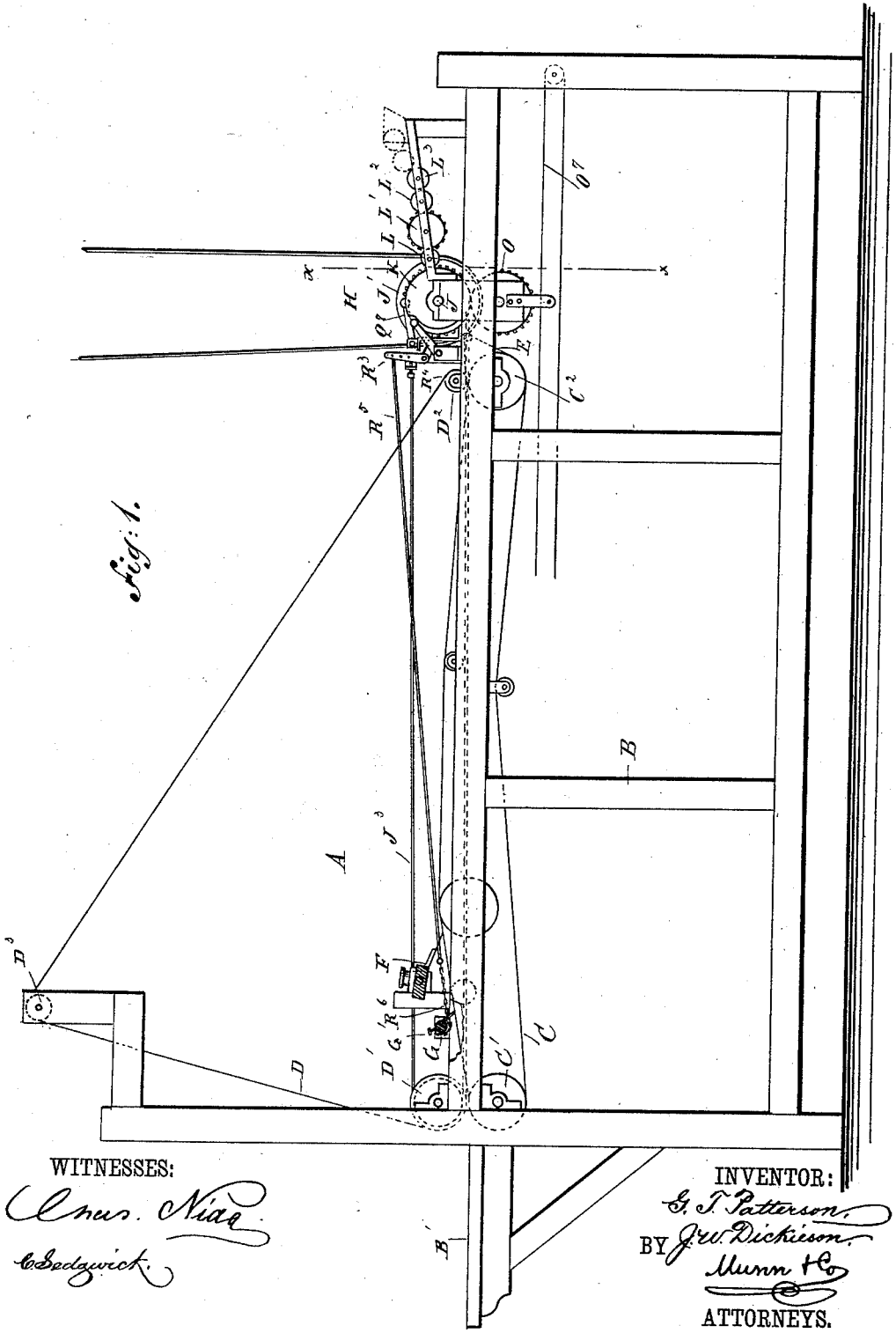

(No Model.) 6 Sheets—Sheet 3.
G. T. PATTERSON & J. W. DICKIESON.
COMBINED RULING MACHINE AND PRINTING ATTACHMENT.
No. 393,517. Patented Nov. 27, 1888.
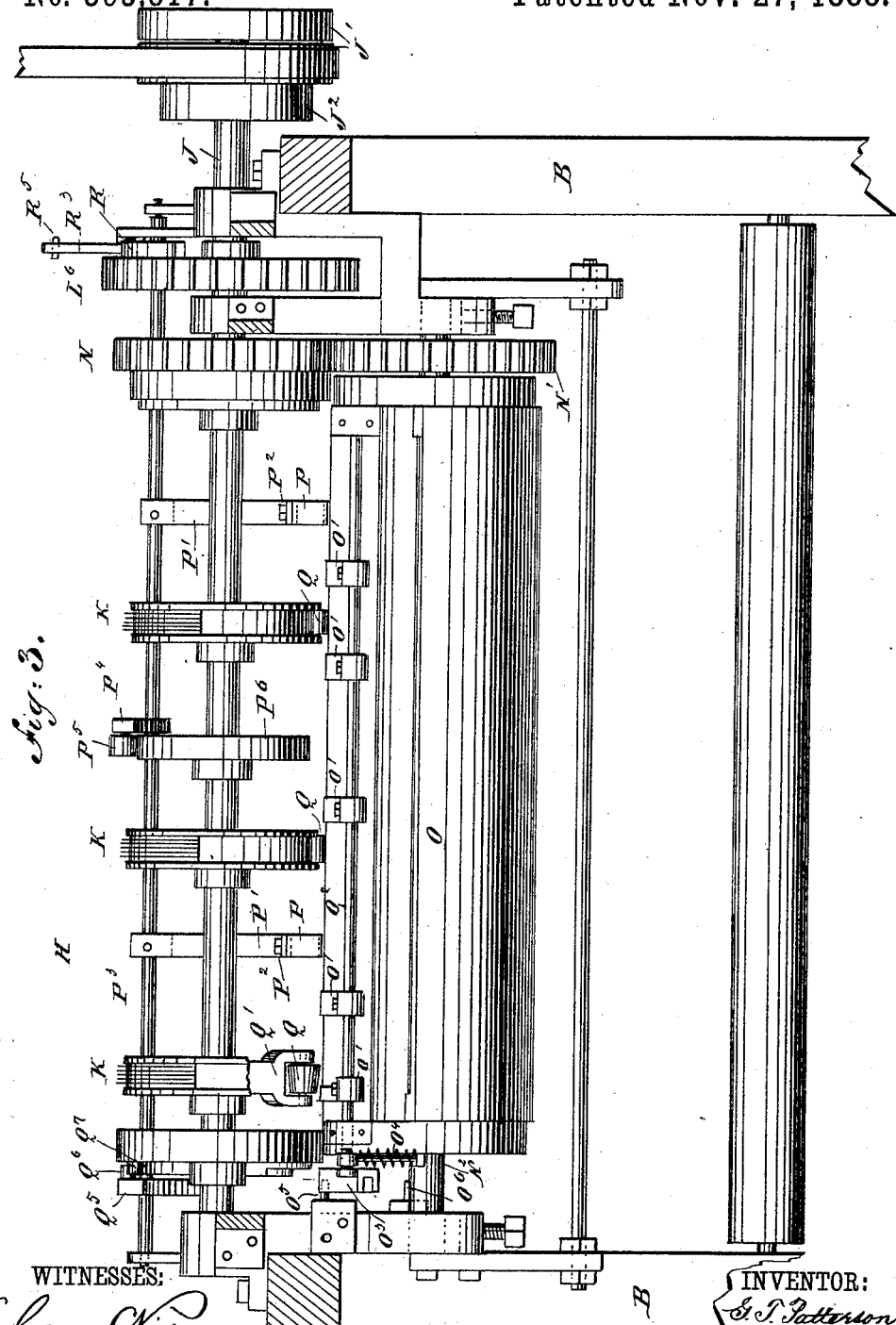
WITNESSES:
Chas. Nida.
C. Sedgwick.
INVENTOR:
G. T. Patterson
J. W. Dickieson
BY Munn & Co.
ATTORNEYS.

(No Model.) 6 Sheets—Sheet 4.
G. T. PATTERSON & J. W. DICKIESON.
COMBINED RULING MACHINE AND PRINTING ATTACHMENT.
No. 393,517. Patented Nov. 27, 1888.
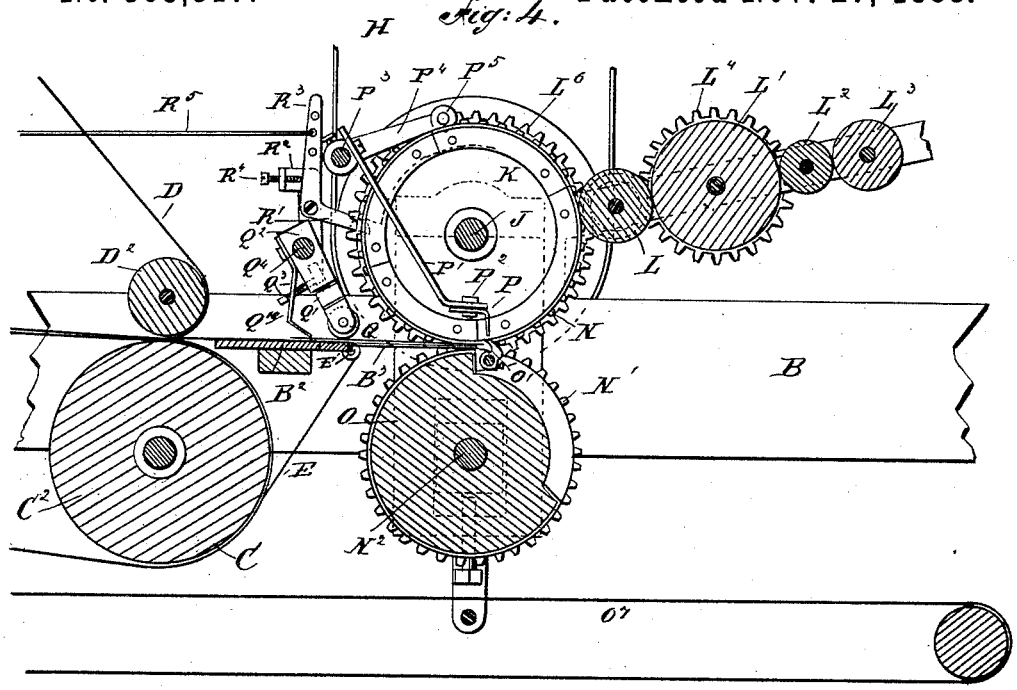
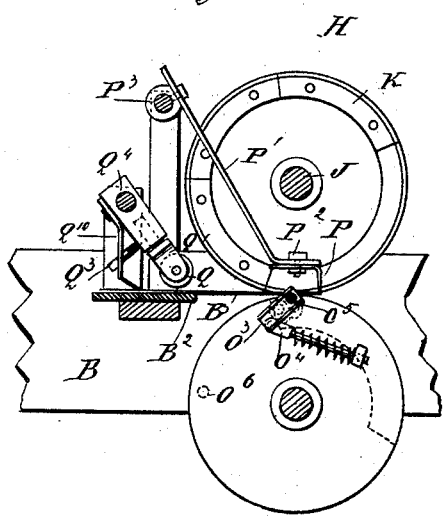
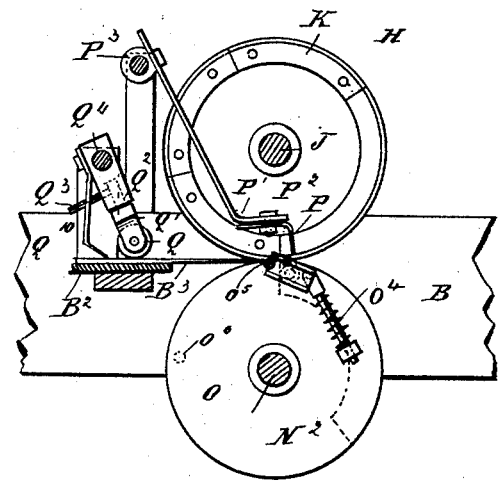
WITNESSES:
INVENTOR:
G. T. Patterson
J. W. Dickieson
BY Munn & Co
ATTORNEYS.

(No Model.) 6 Sheets—Sheet 5.
G. T. PATTERSON & J. W. DICKIESON.
COMBINED RULING MACHINE AND PRINTING ATTACHMENT.
No. 393,517. Patented Nov. 27, 1888.
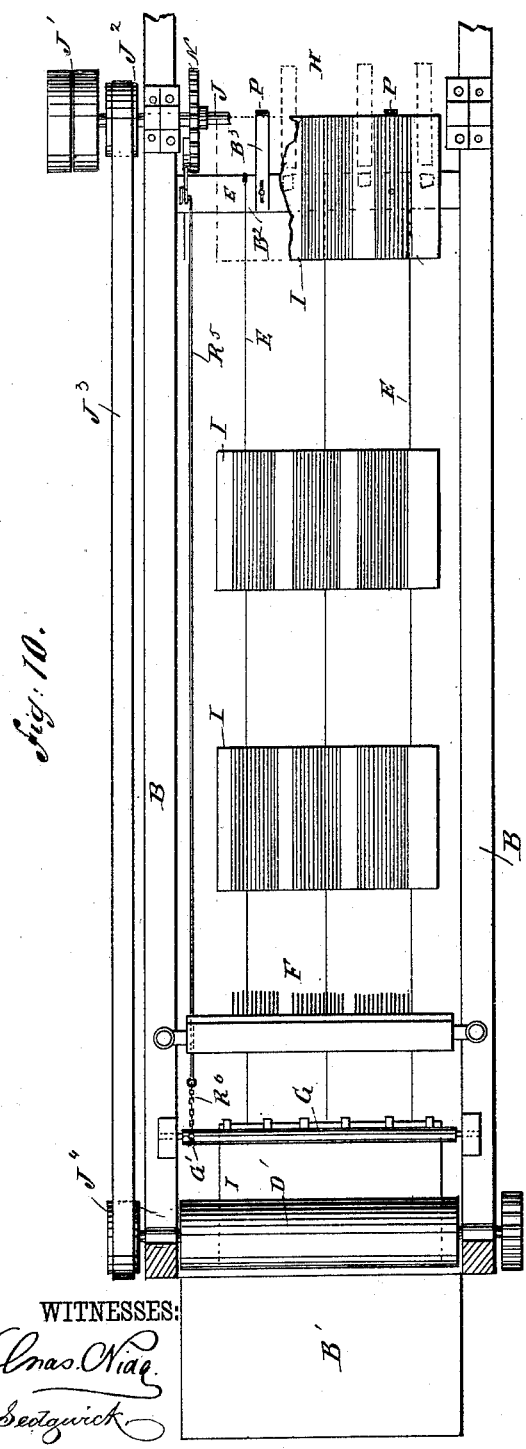
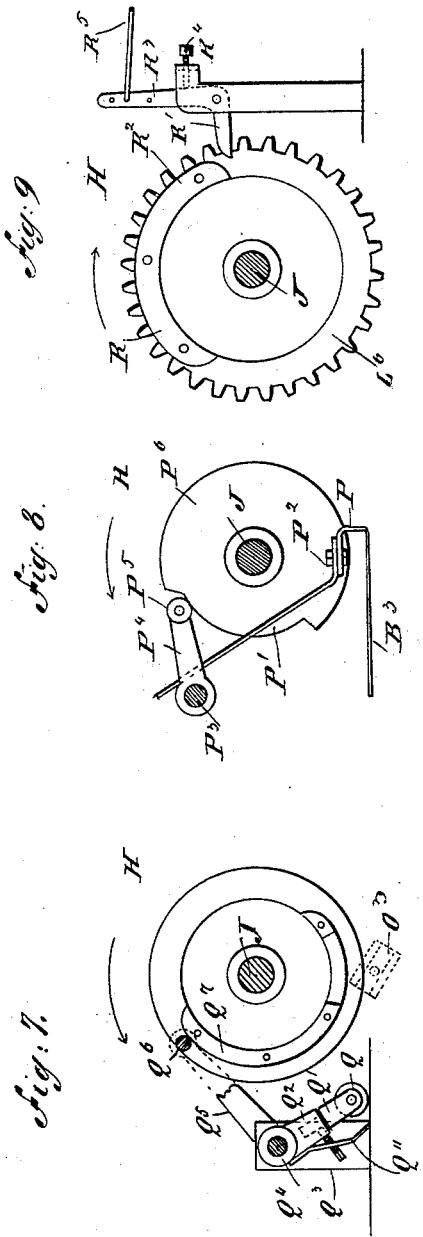

(No Model.) 6 Sheets—Sheet 6.
G. T. PATTERSON & J. W. DICKIESON.
COMBINED RULING MACHINE AND PRINTING ATTACHMENT.
No. 393,517. Patented Nov. 27, 1888.
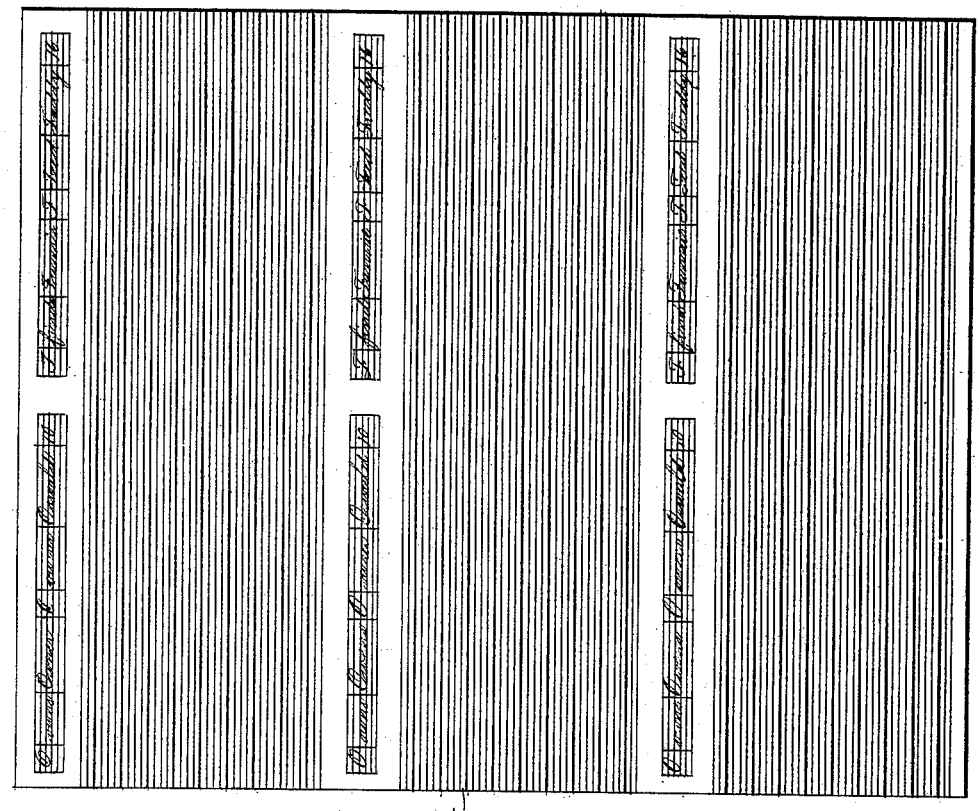
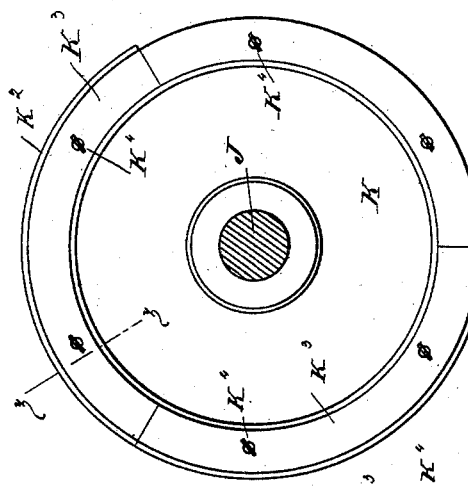
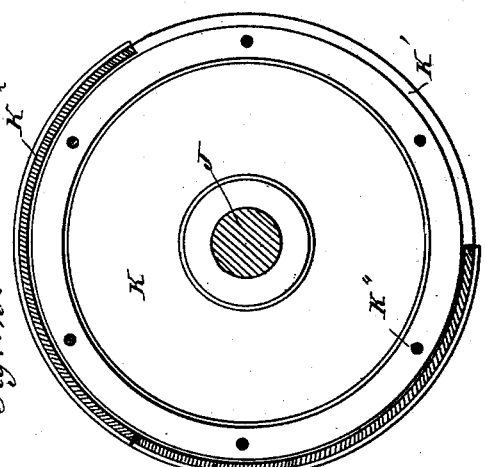
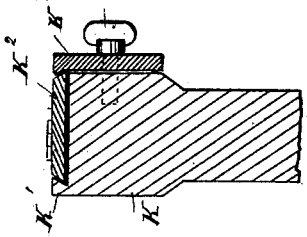
WITNESSES:
Chas. Nida
C. Sedgwick.
INVENTOR:
G. T. Patterson
J. W. Dickieson
BY Munn & Co
ATTORNEYS.

UNITED STATES PATENT OFFICE.

GEORGE T. PATTERSON, OF NEW YORK, AND JAMES W. DICKIESON, OF BROOKLYN, NEW YORK.

COMBINED RULING-MACHINE AND PRINTING ATTACHMENT.

SPECIFICATION forming part of Letters Patent No. 393,517, dated November 27, 1888.

Application filed January 6, 1888. Serial No. 259,995. (No model.)

*To all whom it may concern:*

Be it known that we, GEORGE T. PATTERSON, of the city, county, and State of New York, and JAMES W. DICKIESON, of Brooklyn, in the county of Kings and State of New York, have invented a new and Improved Combined Ruling-Machine and Printing Attachment, of which the following is a full, clear, and exact description.

The object of the invention is to provide a new and improved ruling-machine combined with a printing attachment for ruling sheets of paper and printing matter in perfect alignment and impression on the ruled sheet.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is an enlarged plan view of the printing attachment. Fig. 3 is a transverse sectional elevation of the same on the line $x\,x$ of Fig. 1. Fig. 4 is a longitudinal sectional elevation of the same on the line $y\,y$ of Fig. 2. Fig. 5 is a longitudinal sectional elevation of part of the same on the said line $y\,y$, showing the several parts in a different position. Fig. 6 is a like view of the same, showing the several parts in another position. Fig. 7 is a side elevation of the cam and connections for holding the ruled paper in place. Fig. 8 is a like view, in corresponding position to Fig. 7, of the cam and gate-connections for stopping the ruled sheet. Fig. 9 is a similar view, in corresponding position to Figs. 7 and 8, of the cam and connections for operating the feed-gate of the ruling-machine. Fig. 10 is a plan view of the improvement with parts removed and parts in section. Fig. 11 is an enlarged side elevation of one of the type-cylinders. Fig. 12 is a sectional elevation of the same. Fig. 13 is an enlarged transverse sectional elevation of the rim of the type-cylinder on the line $z\,z$ of Fig. 11, and Fig. 14 is a plan view of a sample of the finished work.

In printing attachments for ruling-machines as heretofore constructed the sheet of paper, after being ruled and carried to the printing attachment, generally bulges upward and sidewise on account of the action of the ruling-pens and the fresh ink from the latter, so that when the type-cylinder acted on the ruled sheet of paper the impression was found badly out of alignment with the lines of the ruled sheet, and the impression which was on the paper was very imperfect; hence the ruled and printed sheets were almost valueless and the paper spoiled. To avoid these difficulties is the object of the invention presently to be described.

The ruling-machine A is in its principal parts of any approved construction, and is mounted on the usual frame, B, provided in its front with the feed-table B', and the ruling-machine A is provided with the blanket C, traveling over the front roller, C', and the rear roller, C², and over the usual intermediate blanket-supporting rollers. The ruling-machine A is also provided with the tapes D, passing over the front feed-roller, D', located directly above the roller C', and the tapes D pass over the rear roller, D², located directly above the rear roller, C², and the said tapes also pass over the top rollers, D³. On the blanket are also held the usual tapes, C³, which travel with the blanket around its rollers. Several tapes, E, also travel with the blanket C, but are extended at the rear and pass over the pulleys E', located at the rear edge of a transverse table, B², secured to the main frame B. Said tapes E pass over the top part of the blanket C, and at the rear end extend beyond the roller C² and pass over the pulleys E', and then back over the blanket on the roller C², as plainly illustrated in Fig. 4.

The ruling-pens F are supported on the main frame B and act on the paper carried between the tapes D, C³, and E and the blanket C in the usual manner. In front of the ruling-pens F and behind the feed-rollers C' and D' is placed a gate, G, controlled from the printing attachment H, located at the rear end of the ruling-machine A and supported on the frame B. The gate G closes down upon the blanket C, and thus prevents a forward movement of the sheet of paper I fed in on the blanket by the feed-rollers C' and D' from the feed-table B'.

At a certain interval the gate G opens and the sheet of paper I is permitted to travel forward on the traveling blanket and tapes, so as to pass under the ruling-pens F in the usual manner and there receive the ruling lines. The gate G then again closes and remains closed the same length of time as before, with a new sheet of paper I resting with its front end against the closed gate. When the latter is again opened by the action of the printing attachment H, the second sheet I travels forward to the ruling-pens and to the printing attachment, and is finally discharged in the usual manner, after being dried, into a box. The several sheets of paper I thus travel one behind the other with a certain space between each two succeeding sheets, said space being governed by the length of time which the gate G remains closed, said gate being controlled by the printing attachment, for the purpose hereinafter more fully specified.

The printing attachment H is provided with the transverse shaft J, carrying the fast and loose driving-pulleys $J'$ and the pulley $J^2$, over which passes the endless belt $J^3$, also passing over a pulley, $J^4$, secured to the shaft of the feed-roller $D'$, so as to impart a rotary motion to the latter, which is geared with the roller $C'$. On the transverse shaft J are secured a number of type-wheels, K, placed suitable distances apart and serving to print matter of any desired description between the lines of the ruled sheets I, as shown in Fig. 14. Each type-wheel K is provided on its rim with an annular dovetail, $K'$, against which fits the similarly-shaped edge of a stereotype-plate, $K^2$, bent to fit the rim of the wheel and carrying on its face the matter which it is desired to print on the ruled sheets I. The type-plates $K^2$ may be made in several sections, if desired, and held in place by sections of rings $K^3$, secured by set-screws $K^4$ to the face of the wheel, and provided at their upper edge with a dovetail fitting a dovetail on the outer edge of the type-plate K, as is plainly shown in Fig. 13. The printed matter or the type-plates $K^2$ do not extend around the entire circumference of the wheel, as shown in Figs. 11 and 12, whereby a space is left between the ends of each type-plate $K^2$. This space corresponds with the space left between two succeeding sheets of ruled paper, I, as shown in Fig. 10. The type-plates $K^2$ can be easily placed on the wheels or removed from the same by the sections of rings $K^3$ being made removable, as described.

The type-plates $K^3$ are inked from the ink-roller L, connected in the usual manner with the several distributing-rollers $L'$, $L^2$, and $L^3$, receiving their supply of ink from the usual fountain filled with ink. The roller $L'$ carries on its shaft a gear-wheel, $L^4$, which meshes into the pinion $L^5$, secured on the shaft of the ink-roller L, and this pinion $L^5$ meshes into a gear-wheel, $L^6$, secured to the transverse shaft J, so that when the latter is rotated the type-wheels K and the ink-rollers L $L'$ $L^2$ are rotated simultaneously.

On the transverse shaft J is secured a gear-wheel, N, which meshes into a gear-wheel, $N'$, secured on the shaft $N^2$, mounted in yielding bearings held on the frame B. The shaft $N^2$ is located directly under the transverse shaft J and carries the impression-cylinder O, provided in its rim with the usual recess, in one end of which is held a transverse shaft, $O^2$, carrying the gripper-fingers $O'$, adapted to hold the sheets of paper on the impression-cylinder while the impression of the type-wheel K is being made. On one outer end of the gripping-finger shaft $O^2$ is secured the cam $O^3$, on which operates the spring-rod $O^4$ in the usual manner, and the said cam $O^3$ is alternately turned by the fixed pins $O^5$ and $O^6$, held on the main frame B. The cam $O^3$ is turned for the purpose of opening and closing the gripping-fingers $O'$, so as to take hold of the sheets of paper at the top and deliver the same on the tapes $O^7$, traveling below the said impression-cylinder O and carrying the ruled and printed sheets along a certain distance in order to dry them, and then the said tapes $O^7$ deposit the printed sheets in a box or other receptacle in the usual manner.

In order to commence the impression of the type-wheels K on the ruled sheets of paper I at the proper moment, the gates P are provided, of which two or more may be employed and held a certain distance to the rear of the vertical line of the shafts J and $N^2$. Each gate P is adjustably secured to an arm, $P'$, by means of a set-screw, $P^2$, so as to stop the sheet of paper I with its front edge in line with the axes of the shafts J and $N^2$. Each gate P is preferably made L-shaped, as is plainly shown in Fig. 8, the lower edge of each gate being in contact when in its lowest position with the front edges of the adjustable tongues $B^3$, secured to the table $B^2$, before mentioned. The tongues $B^3$ are let into the table $B^2$ so as to be even at their top surfaces with the top of the said table $B^2$. The arms $P'$, which carry the gates P, are secured to the transverse shaft $P^3$, mounted in suitable bearings fastened on the main frame B. The shaft $P^3$ carries an arm, $P^4$, on which is mounted to turn a friction-roller, $P^5$, adapted to engage a cam, $P^6$, secured to the transverse shaft J and shaped in such a manner as to open and close the gates P at the proper time.

In front of each type-wheel K is held a roller, Q, preferably made of rubber or other flexible material, and serving to hold the ruled sheet I in place while the impression takes place. The first roller Q is preferably cone-shaped or beveled, as shown in the drawings, so as to exert a sidewise pull on the ruled sheet to prevent it from bulging. Each of the rollers Q is mounted to turn in the forked end of an arm, $Q'$, held adjustably in an arm, $Q^2$, by means of a set-screw, $Q^3$, and each arm $Q^2$ is secured to a shaft, $Q^4$, mounted transversely in suitable bearings secured to the main frame B. On the shaft $Q^4$ is fastened the arm $Q^5$, provided on its free end with a pin or friction-roller, $Q^6$, engaging a cam, $Q^7$, fastened on the transverse shaft J, and serving to move said rollers Q in and out of contact with the ruled sheets I.

On the shaft $Q^4$ are coiled a number of springs, $Q^8$, each fastened by one end on a collar on the said shaft and acting with its other end on a projection formed on the arm $Q^2$, said spring serving to insure a quick upward movement of the friction-rollers Q at the proper moment—that is, when the pin $Q^6$ travels on the lower end of its cam $Q^7$. The spring $Q^9$ is also coiled on the shaft $Q^4$, and is secured by one end to the bearing of the said shaft, its other end acting on a crank-arm, $Q^{10}$, fastened on the shaft $Q^4$. This spring $Q^9$ operates in the opposite direction to the springs $Q^8$, and serves to move the rollers Q quickly downward into contact with the ruled sheets of paper I. On the front edge of each arm $Q^2$ is secured a guard, $Q^{11}$, preferably made of spring metal, and serving to prevent the sheets of paper I from bending upward before entering between the rollers Q and the table $B^2$.

On the rear face of the gear-wheel $L^6$ is formed a cam, R, which operates the gate G in front of the ruling-pens F. The cam R may be placed on a separate wheel, if desired, instead of securing it to the face of the gear-wheel $L^6$. One arm, R', of the bell-crank lever $R^2$ is acted on by the cam R, so as to open and close the gate G at the proper moment. The other arm, $R^3$, of the bell-crank lever $R^2$ has its motion limited by a set-screw, $R^4$, screwing in the bracket on which the said bell-crank lever $R^2$ is mounted. The arm $R^3$ is also provided with a number of apertures, into one of which can be hooked one end of a rod, $R^5$, extending to the front of the ruling-machine A, and carrying near its front end a chain or rope, $R^6$, which passes partly around the shaft of the gate G and is secured to a pin, G', on the shaft of the said gate. The rod $R^5$ is held adjustably on the arm $R^3$ of the bell-crank lever $R^2$, so as to take up any slack or wear on the chain or rope $R^6$. The relative positions of the three cams $Q^7$, $P^6$, and R at one given point is plainly illustrated in Figs. 7, 8, and 9, and the relative positions of the gripping-fingers O', the gates P, and the rollers Q are plainly illustrated in Figs. 4, 5, and 6.

The operation is as follows: A rotary motion is imparted to the transverse shaft J by suitable means, so that the several movable parts of the entire machine are set in motion, and when the operator now feeds a sheet of paper between the rollers C' and D' at the front end of the machine said sheet passes, as above described, to the feed-gate G, which permits a forward movement of one sheet for every revolution of the shaft J. The gate G is thus opened and closed once for every revolution of the shaft J, as the cam R, rotating on the said shaft, acts on the bell-crank lever $R^2$ and exerts a pull on the rod $R^5$ and the chain $R^6$, whereby the said gate G is opened, say, through three-quarters of one revolution of the shaft J and closed through one-quarter or the remainder of the said revolution. The ruling-pens F can operate on the sheet in the usual manner, and then a new sheet is passed in, as above described, so that the several sheets I travel one behind the other with an intervening space, as shown in Fig. 10. When the first sheet passes over the ends of the tapes D, $C^3$ and the blanket C, it is carried farther toward the rear onto the table $B^2$ and the tongues $B^3$ by the tapes E and passes under the guards $Q^{11}$ and the rollers Q, which are held for the time being in their uppermost position and do not touch the sheets. The front edge of the sheet of ruled paper I finally strikes against the closed gates P, and is held in a stationary position until the gripping-fingers O' are on top and are opened by the fixed pin $O^5$ acting on the cam $O^3$, so that the said fingers are ready to close down upon the edge of the sheet. At this moment one end of the type-plate $K^2$ is in its lowermost position nearing the contact or impression line with the top of the impression-cylinder O, as shown in Fig. 4. The action of the cam $P^6$ on the friction-wheel $P^5$, held on the arm $P^4$, now throws the gates P upward suddenly, and the gripping-fingers O' close as the cam $O^3$ leaves the fixed pin $O^5$, so that the said fingers hold the edge of the paper tightly on the impression-cylinder, which carries the sheet along. The rollers Q at this same moment are moved quickly downward on the sheet by the action of the cam $Q^7$ and the pin $Q^6$ of the arm $Q^5$, the spring $Q^9$ permitting a slightly-yielding motion of the said rollers Q. The type-wheels K now make the impression on the ruled sheet, which is pulled along by the impression-cylinder O and the gripping fingers O'. The type-wheels K are so located in relation to the ruling-pens F that the impression takes place in the space left blank by the several sets of ruling-pens, as shown in Figs. 10 and 14. The length of the type-plate $K^2$ on the type-wheel K corresponds with the length of the sheet, so that when the sheet has passed between the said type-wheel K and the impression-cylinder O the rear end of the type-plate $K^2$ is in its uppermost position and passes over the sheet of paper at its inner edge. The gripping-fingers O' are opened as soon as the sheet of paper is printed, and then the printed sheet drops on the tapes $O^7$, and is carried forward and backward in the usual manner in order to dry it, and is finally deposited in a box or other suitable receptacle. The next ruled sheet passes first to the gates P, and is there retained until the gripping-fingers O' are on top in an open position and the end of the type-plate K is in its lowermost position. The gates P are then swung upward, the gripping-fingers close on the edge of the sheet and pull it forward on the rotary motion of the impression-cylinder, and then the rollers Q press down upon the sheet and prevent it from bulging, and the outermost roller Q, on account of its bevel, stretches the sheet tight, so that the latter is perfectly guided between the type-wheel and the impression-cylinder, whereby the impression is made perfect and parallel with the ruled lines on the sheet.

The cams Q⁷, P⁶, R, and O³ are placed in such a position in relation to the type-wheels K that they act almost simultaneously with each other, so that the above-described operation of the opening of the gates P, the closing of the gripping-fingers, the downward movement of the rollers Q, and the opening of the gate G take place nearly at the same time, in succession, however, as stated.

It is understood that the type wheels K and the impression-cylinder O rotate together, on account of being geared together, as shown and described, and in a similar manner the feed-rollers C' and D' rotate together, also on account of being geared together, thereby imparting a uniform speed to the tapes D E C³ and the blanket C.

Having thus fully described my invention, I claim as new and desire to secure by Letters Patent—

1. A combined ruling and printing machine comprising a frame, a horizontal endless sheet-carrier, ruling-pens extending across the carrier near its front end, a gate between the rollers at the receiving end of said carrier and the pens to prevent the passage of the sheets under the pens, a printing attachment at the delivery end of the carrier, and a connecting mechanism between said attachment and the gate for raising said gate at stated intervals, substantially as set forth.

2. In a combined ruling and printing machine, the combination, with the frame, the horizontal endless carrier, the ruling-pen beam or bar extending across said carrier near its front end, and the parallel vertical rocking gate between said pen-beam and the front rollers of the carrier, of a printing attachment at the delivery end of the carrier and a rock-shaft having a series of gates for stopping the sheets at the point of impression, and mechanism, substantially as described, for raising said front and rear gates at proper intervals, substantially as set forth.

3. The combination, with the rotary type-wheels, the impression-cylinder under the same, an endless carrier, and tongues leading from the delivery end of the carrier to points between said type-wheels and cylinder, of the vertically-movable gates extending between the several wheels and registering, when lowered, with the ends of said tongues, and mechanism, substantially as set forth, for raising said gates when the type-surface reaches the impression-cylinder, substantially as described.

4. The combination, with type-wheels and an impression-cylinder, of a fixed table held in front of the said type-wheels and impression-cylinder, rollers held above the said fixed table and in front of the said type-wheels and impression-cylinder, and a guard held in front of each of the said rollers, substantially as shown and described.

5. The combination, with type-wheels and an impression-cylinder, of a fixed table held in front of the said type-wheels and impression-cylinder, a series of rollers held above the said fixed table parallel with and in front of the said type-wheels and impression-cylinder, and a cam rotating with the said type-wheels for pressing said rollers onto or lifting them from the ruled sheet when passing between them and the upper side of the table, substantially as shown and described.

6. The combination, with type-wheels, an impression-cylinder, and gripping-fingers held on the said impression-cylinder for moving the ruled sheet forward, of a fixed table held in front of the said type-wheels and impression-cylinder, and a series of rollers held above the said fixed table parallel with the said cylinder and wheels, substantially as shown and described.

7. The combination, with the rotary type-wheels, the impression-cylinder thereunder, the endless carrier, and tongues between the delivery end of the carrier and the points of impression, of a transverse rock-shaft having downwardly-projecting gates registering with the free ends of the tongues, a second rock-shaft in front of said gate-shaft and having downward and rearward inclined arms provided with rollers, lever-arms for rocking said two shafts, and rotary cams constructed to successively operate said lever-arms, substantially as set forth.

8. The combination, with the ruling and printing mechanisms, of an intermediate endless carrier, gates mounted on shafts journaled just in front of the ruling-pens and printing mechanism, respectively, and a transverse shaft carrying rollers to rest on the sheet just in front of the printing mechanism, lever-arms for said shafts, and a series of cams operated from the printing-wheel shaft with their cam-surfaces constructed to successively operate said lever-arms, substantially as set forth.

9. The combination, with the endless carrier, a table on which it delivers, tongues extending therefrom, and the printing mechanism to which the tongues lead, of the automatically-operated gates registering with the free ends of the tongues and a rock-shaft in front of said gates above the table and having arms extending downwardly and carrying elastic rollers, the end roller being in the form of a frustum of a cone, with its base or larger end toward the center of the shaft to exert an outward tension on the sheet, substantially as set forth.

10. The combination, with type-wheels, an impression-cylinder rotating with the said type-wheels, and gripping-fingers held on the said impression-cylinder, of a fixed table held in front of the said impression-cylinder, rollers held above the said fixed table, arms carrying the said rollers, a shaft on which the said arms are secured, a cam rotating with the said type-wheels and imparting an oscillating motion to the said shaft, and springs coiled on the said shaft and operating on the said arms carrying the rollers, substantially as shown and described.

11. The combination, with the type-wheels K, the impression-cylinder O, rotating with the said type-wheels K, and the gripping-fingers O', held on the said impression-cylinder O, of the fixed table B², held in front of the said impression-cylinder O and carrying the grooved pulleys E', the tapes E, passing over said fixed table B² and the said pulleys E', the tongues B³, held on the said fixed table and projecting to the top of the said impression-cylinder, and the gates P, held in the front ends of the said tongues and opened and closed by the cam P⁶, rotating with the said type-wheels K, substantially as shown and described.

12. The combination, with the type-wheels K, the impression-cylinder O, operating with the said type-wheels K, and the gripping-fingers O', held on the said impression-cylinder O, of the fixed table B², held in front of the said impression-cylinder O and carrying the grooved pulleys E', the tapes E, passing over the said fixed table B² and the said pulleys E', the tongues B³, held on the said fixed table and projecting to the top of the said impression-cylinder, the gates P, held in the front ends of the said tongues and opened and closed by the cam P⁶, rotating with the said type-wheels K, and the rollers Q, held above the said fixed table in front of the said type-wheels K and controlled by the action of the cam Q⁷, rotating with the said type-wheels, substantially as shown and described.

13. The combination, with the type-wheel K, provided on its rim with an annular dovetail, K', to receive the inner edge of a stereotype-plate, of the ring-sections K³ on the face of the wheel, and provided on inner upper edges with dovetails to engage the opposite edges of said plates, and the screws K⁴, securing said sections in place.

GEORGE T. PATTERSON.
JAMES W. DICKIESON.

Witnesses:
PHILIP ASCHER,
EUG. C. PATTERSON.